United States Patent
Fewtrell

(10) Patent No.: US 10,771,329 B1
(45) Date of Patent: Sep. 8, 2020

(54) AUTOMATED SERVICE TUNING

(71) Applicant: Amazon Technologies, Inc., Reno, TX (US)

(72) Inventor: Zachary Ganwise Fewtrell, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 14/223,930

(22) Filed: Mar. 24, 2014

(51) Int. Cl.
  *H04L 12/24* (2006.01)

(52) U.S. Cl.
  CPC ................ *H04L 41/0816* (2013.01)

(58) Field of Classification Search
  CPC . H04L 41/0823; H04L 41/0893; H04W 4/001
  USPC ......................................... 709/221
  See application file for complete search history.

(56) References Cited

U.S. PATENT DOCUMENTS

| | | | |
|---|---|---|---|
| 5,581,657 A | 12/1996 | Lyon | |
| 6,721,647 B1 | 4/2004 | Kita et al. | |
| 8,037,453 B1* | 10/2011 | Zawadzki | G06F 8/71 717/107 |
| 8,131,656 B2 | 3/2012 | Goldberg et al. | |
| 8,515,793 B2* | 8/2013 | Chen | G06Q 10/04 705/7.11 |
| 2003/0078959 A1* | 4/2003 | Yeung | G06F 8/62 709/201 |
| 2006/0047794 A1 | 3/2006 | Jezierski | |
| 2006/0107087 A1* | 5/2006 | Sieroka | G06F 9/4856 714/4.1 |
| 2008/0059972 A1* | 3/2008 | Ding | G06F 9/505 718/105 |
| 2010/0100401 A1* | 4/2010 | Rolia | G06Q 10/06 705/7.39 |
| 2010/0199267 A1* | 8/2010 | Rolia | G06Q 10/04 717/135 |
| 2014/0019966 A1* | 1/2014 | Neuse | G06F 9/45533 718/1 |
| 2014/0047342 A1* | 2/2014 | Breternitz | G06F 9/5061 715/735 |

* cited by examiner

*Primary Examiner* — Tonia L Dollinger
*Assistant Examiner* — Jonathan A Sparks
(74) *Attorney, Agent, or Firm* — Robert C. Kowert; Kowert, Hood, Munyon, Rankin & Goetzel, P.C.

(57) ABSTRACT

Methods and systems for automated service tuning are disclosed. A plurality of tests are performed using a plurality of servers. Individual ones of the plurality of tests vary candidate values for one or more configuration parameters for the servers. A respective fitness value is determined for individual ones of the plurality of tests. The fitness values are determined based on the performance of the servers during the tests. One or more optimized values are selected for the one or more configuration parameters based on the fitness values. The one or more selected values collectively optimize the servers.

20 Claims, 10 Drawing Sheets

AUTOMATED SERVICE TUNING

BACKGROUND

Many companies and other organizations operate computer networks that interconnect numerous computing systems to support their operations, such as with the computing systems being co-located or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the computing resources have become increasingly complicated.

Examples of such large-scale systems include online merchants and marketplaces, internet service providers, online businesses such as photo processing services, corporate networks, cloud computing services, web-based hosting services, etc. These entities may maintain computing resources in the form of large numbers of computing devices (e.g., thousands of hosts) that are hosted in geographically diverse locations. Web servers backed by distributed systems may provide online marketplaces that offer goods and/or services for sale to consumers. For instance, consumers may visit a merchant's website to view and/or purchase goods and services offered for sale by the merchant (and/or third party merchants). In various cases, such network-based marketplaces may rely on a service-oriented architecture to implement various business processes and other tasks. The service-oriented architecture may be implemented using a distributed system that includes many different computing resources and many different services that interact with one another.

The performance and/or cost of such a system may be influenced by many different configuration options. Systems may be sub-optimally configured by system administrators based on guesswork or incomplete data. Additionally, a configuration may become out-of-date as the components of the system are updated or as usage patterns change.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for performing automated service tuning are described. Using the methods and systems as described herein, services, servers, and/or other components may be tuned in an automatic manner to improve their performance characteristics and/or cost characteristics. The performance characteristics and/or cost characteristics may relate to the collective operation of multiple servers and/or services, including servers and/or services in different tiers. The automated tuning may determine the optimized configuration parameters for a system based on multiple test runs with varying values for the configuration parameters. The automated tuning may be performed continuously on different subsets of production servers or on servers that are isolated from production traffic. Optimized values determined for a subset of the servers may be deployed to other servers. In this manner, a system comprising multiple servers and/or services may be automatically tuned as conditions change over time.

Figure 1:
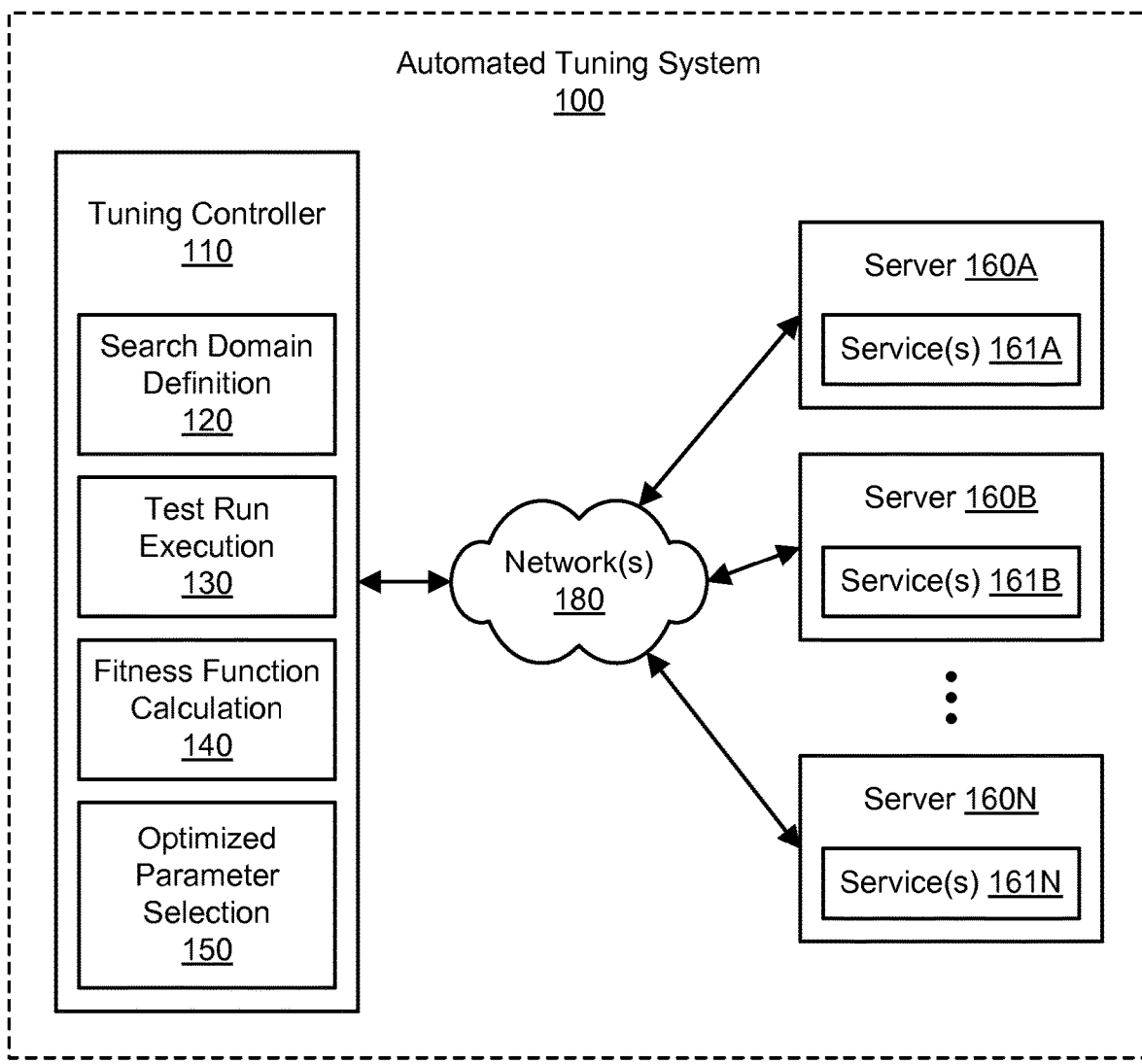
FIG. 1 illustrates an example system environment for automated service tuning, according to one embodiment.

FIG. 1 illustrates an example system environment for automated service tuning, according to one embodiment. The example system environment may implement an automated tuning system 100. The automated tuning system 100 may include at least one tuning controller 110 and a plurality of servers such as servers 160A and 160B through 160N. Although one tuning controller 110 and three servers 160A, 160B, and 160N are illustrated for purposes of example, it is contemplated that any suitable number and configuration of tuning controllers and servers may be used with the automated tuning system 100. The automated tuning system 100 may use one or more networks 180 and interconnections to couple the various components. Elements of the automated tuning system 100 may be located in any suitable location relative to one another, from being virtual compute instances hosted on the same computing hardware to being different physical compute instances hosted in the same data center to being geographically remote. In one embodiment, the tuning controller 110 may be implemented using a separate computing device that is coupled to the servers 160A-160N over the network(s) 180. In one embodiment, as further discussed with respect to FIG. 5, one or more of the servers 160A-160N may implement the functionality of the tuning controller 110. It is contemplated that the automated tuning system 100 may include additional components not shown, fewer components than shown, or different combinations, configurations, or quantities of the components shown.

In various embodiments, the tuning controller 110 may manage an automated tuning process involving one or more of the servers 160A-160N. The tuning controller 110 may include a plurality of components that are configured to perform aspects of automated tuning. For example, the tuning controller 110 may include search domain definition functionality 120, test run execution functionality 130, fitness function calculation functionality 140, and optimized parameter selection functionality 150. The tuning controller 110 may comprise one or more computing devices, any of which may be implemented by the example computing device 3000 illustrated in FIG. 10. In various embodiments, the functionality of the different services, components, and/or modules of the tuning controller 110 (e.g., search domain definition functionality 120, test run execution functionality 130, fitness function calculation functionality 140, and optimized parameter selection functionality 150) may be provided by the same computing device or by different computing devices. If any of the various components are implemented using different computing devices, then the respective computing devices may be communicatively coupled, e.g., via a network. Each of the search domain definition functionality 120, test run execution functionality 130, fitness function calculation functionality 140, and optimized parameter selection functionality 150 may represent any combination of software and hardware usable to perform their respective functions, as discussed as follows.

In one embodiment, the search domain definition functionality 120 may define a set of configuration parameters and a set of candidate values for each configuration parameter. The configuration parameters may relate to the operation of any suitable services, servers, and/or other components that are sought to be optimized. In one embodiment, the search domain (e.g., the configuration parameters and candidate values) may be defined based on input from a user. In one embodiment, the search domain may be defined based on automatic and/or programmatic discovery of various configurable elements of services, servers, and/or other components. A configuration parameter may be associated with upper and/or lower boundaries for values in the search domain. A configuration parameter may be seeded with one or more initial values in the search domain.

The configuration parameters may include parameters related to memory usage, network usage, processor usage, and/or any suitable configurable element of a service, server, or other component. For example, configuration parameters may include a cache size, a heap size, a thread pool size, compiler options, etc. In one embodiment, the host type (e.g., the hardware platform of a server) may be a configuration parameter. Each host type may be associated with one or more cost valuations, such as a total cost of ownership (TCO), a capital expenditure, and/or any other suitable cost valuation with or without a time component. In one embodiment, the operating system of a server may be a configuration parameter. In one embodiment, the number of instances of a particular service in operation on the servers 160A-160N may be a configuration parameter. In one embodiment, the use of compression or encryption for communication among services may be a configuration parameter; enabling such features may slow individual services but improve the collective performance of the system. At least a portion of the configuration parameters may influence the interaction among services, servers, and/or other components. In other words, at least a portion of the configuration parameters may influence the collective performance and/or cost of the system as a whole.

In one embodiment, the test run execution functionality 130 may implement one or more test runs using the servers 160A-160N. A test run may also be referred to herein as a test. For each test run, a subset of the candidate values in the search domain may be assigned to the relevant services, servers, and/or other components used in the test run. For a given test run, the same value or different values may be assigned to a configuration parameter across multiple servers and/or services. At least a portion of the candidate values may be modified from one test run to another. Modification of the candidate values may alter the performance characteristics and/or cost characteristics of the services, servers, and/or other components used in the test run. The test run execution functionality 130 may use any suitable interface(s) to cause modification of the values of the configuration parameters in the services, servers, and/or other components used in the test run.

In one embodiment, the test run execution functionality 130 may select and/or provision a subset (i.e., one or more) of the servers 160A-160N to implement any given test run. Individual servers may be selected based on any suitable combination of characteristics. For example, a server may also be selected based on its hardware and/or software configuration, its performance metrics, its usage costs, etc. In one embodiment, the host type of a server (e.g., the hardware platform) may be a configuration parameter, and the identity of the servers in use may be changed from test run to test run as the value of the host type is modified. Similarly, the installed services on a particular server may be changed from test run to test run based on the modification of a relevant configuration parameter (e.g., the number of instances of a service and/or the version of a service).

Once the servers 160A-160N have been selected, provisioned, and/or configured based on a subset of the candidate values associated with a particular test run, the services 161A-161N may be executed accordingly. In one embodiment, a particular test run may proceed until a predetermined duration of time for the test run has elapsed. In one embodiment, a particular test run may proceed until a performance and/or cost threshold has been met or exceeded. For example, a test run may be ended prematurely if a particular failure condition is encountered at any point during the test run. The test run execution functionality 130 may use any suitable interface(s) to cause execution of the services, servers, and/or other components during in the test run. In one embodiment, multiple test runs may be executed in parallel, e.g., using different sets of servers. Performance metrics may be collected during a test run to gauge the relative success or failure of the subset of candidate values used in the test run.

In one embodiment, individual ones of the servers 160A-160N and/or services 161A-161N may be located in different tiers of the same system. For example, to implement an online marketplace, a first tier may include services that build and provide web pages to customers, a second tier may include various backend services (e.g., services that maintain a product catalog), and a third tier may include storage solutions. Using the automated tuning system 100, servers and/or services from multiple tiers (e.g., all of the tiers) may be tested as a unit and optimized as a unit. Accordingly, the search domain definition functionality 120 may define candidate values for configuration parameters for servers and/or services in more than one of the tiers. In one embodiment, each test run may be implemented using a set of the candidate values for servers and/or services in multiple tiers. In this manner, a collective performance and/or cost may be optimized for a system that includes multiple tiers of services.

In one embodiment, the fitness function calculation functionality 140 may calculate at least one fitness function for each test run. The fitness function may return a numeric fitness value for a subset of candidate values used in a test run such that different test runs and subsets of candidate values can be ranked. Accordingly, the fitness value may indicate the relative fitness of a test run (and of the candidate values used in the test run) relative to one or more performance goals and/or cost goals. In one embodiment, the fitness function may be defined based on input from a user. The fitness function may include multiple terms (e.g., terms representing different performance metrics and/or cost metrics), and individual terms may be weighted. For example, a fitness function may include terms representing a latency percentile, a maximum transactions per second per host, a maximum transactions per second per TCO (total cost of ownership) unit, a total throughput for all hosts, and/or other suitable elements of performance and/or cost. In one embodiment, the fitness value may represent the collective performance and/or cost of multiple services, servers, and/or other components. In one embodiment, the fitness value may be based on the interaction of services, servers, and/or other components with each other. The fitness function may be calculated based on performance metrics (including cost assessments) generated for the corresponding test run.

In one embodiment, the optimized parameter selection functionality 150 may select one or more of the candidate values for the configuration parameters based on the results of the test runs (e.g., the fitness values). The optimized parameter selection functionality 150 may include a solver that attempts to find, among the candidate values for the configuration parameters, a solution yielding the best fitness value. In one embodiment, the solver may return an optimized value for a parameter along with a sensitivity of the value. In one embodiment, the optimized parameter selection functionality 150 may determine that optimized values have not been found and may determine values (e.g., may select candidate values) for use in another test run. Accordingly, the optimized parameter selection functionality 150 may assign a new subset of the candidate values for the next test run. In one embodiment, the optimized parameter selection functionality 150 may determine that optimized values for the configuration parameters have been found, and the current batch of test runs may be halted. As used herein, the term "optimized" generally means "improved" rather than necessarily "optimal." In one embodiment, the automated tuning system 100 may run continuously or at regular intervals, and eventually a new batch of test runs may be initiated automatically by the tuning controller 110 in case the optimized values have changed over time (e.g., due to a change in system usage and/or a change in system components). In various embodiments, the optimization process may end or be suspended if the performance and/or cost of the servers and/or services with the optimized values satisfies a particular goal, if a window of time for performing the optimization has expired, and/or if a predetermined number of iterations or test runs have been completed.

Any suitable solver (e.g., a non-linear optimization solver) may be used with the automated tuning system 100. In one embodiment, the optimized parameter selection functionality 150 may implement a solver for a genetic algorithm. To implement a genetic algorithm, a population of candidate solutions may be "evolved" toward improved solutions over multiple test runs. Each candidate solution may be encoded as a string or array of numeric values that represents a "genome" of the solution. In other words, each candidate value for a configuration parameter may represent a portion of a genome for a candidate solution that is implemented for a particular test run. The multiple test runs may represent an iterative process; with each iteration, the relative fitness of one or more test runs may be evaluated, as discussed above. In one embodiment, at least a portion of the candidate values may be assigned randomly (within any defined boundaries) to an initial candidate solution, while other candidate values may be seeded. Over time, the "fitter" individuals may be stochastically selected, and each individual's genome may be modified to produce the next generation. From one generation to the next, genomes may be modified using any suitable technique(s), such as recombination, random mutation, etc., using operators for mutation, crossover, inversion, and selection. In one embodiment, the solver may terminate when a maximum number of generations has been produced. In one embodiment, the solver may terminate when a sufficiently improved solution has been found.

Each of the servers 160A-160N may be configured to execute one or more services. For example, server 160A may be may be configured to execute one or more services 161A, server 160B may be may be configured to execute one or more services 161B, and server 160N may be may be configured to execute one or more services 161N. In one embodiment, at least some of the services may differ from server to server. In one embodiment, the services 161A and 161B through 161N may comprise different instances of the same services. In one embodiment, multiple instances of the same service may run on an individual server. In one embodiment, multiple instances of the same service may run on multiple ones of the servers 160A-160N. In one embodiment, the services installed on a particular server may be changed from test run to test run, e.g., based on instructions from the tuning controller 110.

The servers 160A-160N may implement a service-oriented system using services 161A-161N configured to communicate with each other (e.g., through message passing) to carry out various tasks. Each of the services 161A-161N may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to build a web page dynamically, numerous services may be invoked in a hierarchical manner to build various components of the web page. In some embodiments, services may be loosely coupled in order to minimize (or in some cases eliminate) interdependencies among services. This modularity may enable services to be reused in order to build various applications through a process referred to as orchestration. A service may include one or more components that may also participate in the service-oriented system, e.g., by passing messages to other services or to other components within the same service.

The service-oriented system may be configured to process requests from various internal or external systems, such as client computer systems or computer systems consuming networked-based services (e.g., web services). For instance, an end-user operating a web browser on a client computer system may submit a request for data to an online marketplace implemented using the services 161A-161N (e.g., data associated with a product detail page, a shopping cart application, a checkout process, search queries, etc.). In another example, a computer system may submit a request for a web service (e.g., a data storage service, a data query, etc.). In general, the services 161A-161N may be configured to perform any of a variety of business processes.

The services 161A-161N described herein may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services.

Figure 10:
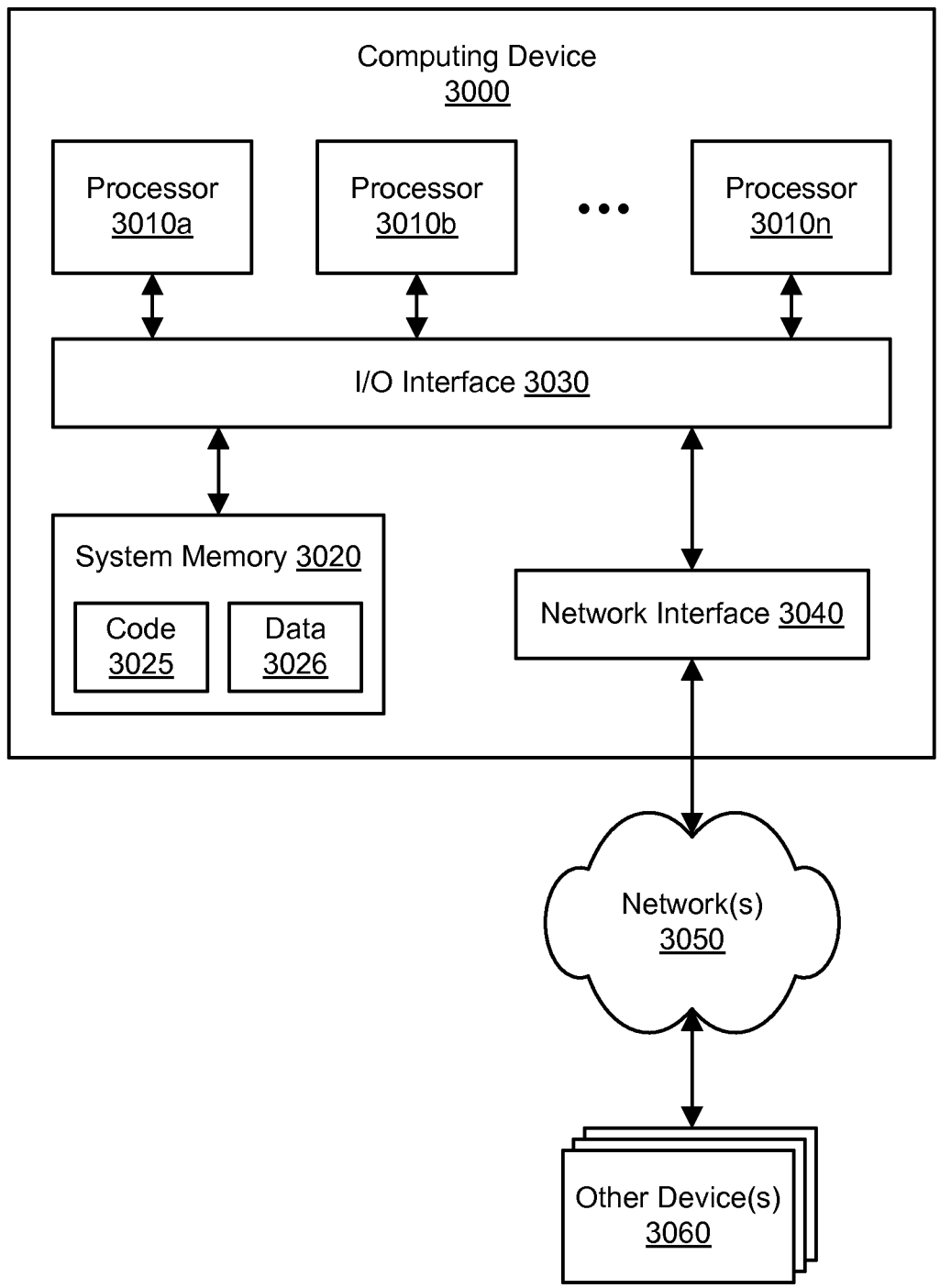
FIG. 10 illustrates an example of a computing device that may be used in some embodiments.

Each of the servers 160A-160N may comprise one or more computing devices, any of which may be implemented by the example computing device 3000 illustrated in FIG. 10. In various embodiments, portions of the functionality of the automated tuning system 100, including the tuning controller 110 and the servers 160A-160N, may be provided by the same computing device or by any suitable number of different computing devices. In some embodiments, the tuning controller 110 and/or servers 160A-160N may be implemented as virtual compute instances or as physical compute instances. The virtual compute instances and/or physical compute instances may be provisioned and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 10.

In one embodiment, a suitable component of the automated tuning system 100 may select and/or provision the servers 160A-160N. For example, the servers 160A-160N may be provisioned from a suitable pool of available computing instances. In one embodiment, additional computing instances may be added to the servers 160A-160N as needed. In one embodiment, computing instances may be returned to the pool of available computing instances from the servers 160A-160N if the computing instances are not needed at a particular point in time.

In one embodiment, the functionality of aspects of the automated tuning system 100, including the tuning controller 110 and/or servers 160A-160N, may be provided to clients using a provider network. For example, the functionality of the automated tuning system 100 may be presented to clients as a web-accessible service. A network set up by an entity such as a business or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A number of different types of computing devices may be used singly or in combination to implement the resources of the provider network in different embodiments, including general purpose or special purpose computer servers, storage devices, network devices, and the like.

In one embodiment, a provider network may implement a flexible set of resource reservation, control, and access interfaces for clients. For example, a provider network may implement a programmatic resource reservation interface (e.g., via a web site or a set of web pages) that allows clients to learn about, select, purchase access to, and/or reserve resources. In one embodiment, the servers 160A-160N may be reserved by the tuning controller 110 or any other suitable component using such an interface. In one embodiment, the tuning controller 110 may use one or more suitable interfaces (such as one or more web pages, an application programming interface [API], or a command-line interface [CLI]) to reserve and configure the servers 160A-160N.

Figure 2:
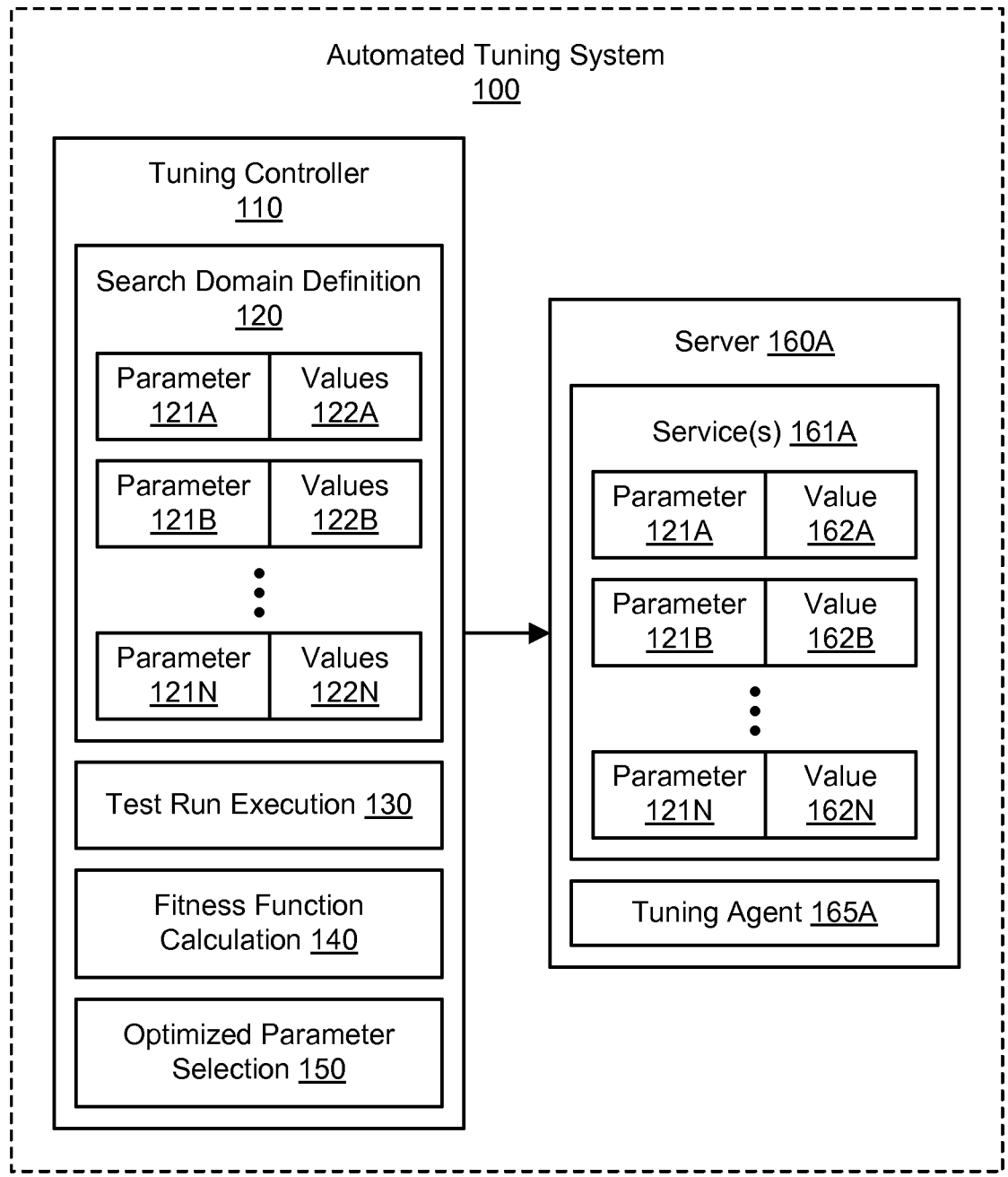
FIG. 2 illustrates an example system environment for automated service tuning including the definition of parameters and values for a search domain, according to one embodiment.

FIG. 2 illustrates an example system environment for automated service tuning including the definition of parameters and values for a search domain, according to one embodiment. As discussed above, the search domain definition functionality 120 may define a set of configuration parameters and a set of candidate values for each configuration parameter. For example, the search domain may be defined to include a plurality of configuration parameters such as parameters 121A and 121B through 121N. Each of the parameters 121A-121N may be associated with a particular set of candidate values in the search domain. For example, configuration parameter 121A may be associated with a plurality of candidate values 122A, configuration parameter 121B may be associated with a plurality of candidate values 122B, and configuration parameter 121N may be associated with a plurality of candidate values 122N. As discussed above, each parameter may also be associated with value boundaries and/or seed values. The values for a particular parameter may include a continuous range of values (e.g., as defined by a minimum and maximum) and/or a set of discrete values. Although three parameters 121A, 121B, and 121N are illustrated for purposes of example, it is contemplated that any suitable number and configuration of configuration parameters and candidate values may be used with the automated tuning system 100.

For each test run and each service, server, and/or other component used in the test run, the automated tuning system 100 may configure the service, server, and/or other component with a subset of the candidate values. In one embodiment, the subset of candidate values may represent all or part of a genome used in a genetic algorithm. In one embodiment, each server may include a tuning agent that acts as an interface between the server and the tuning controller 110. For example, as shown in FIG. 2, the server 160A may include a tuning agent 165A. The tuning controller 110 may use the tuning agent 165A to configure the relevant components of the server 160A with the selected candidate values, e.g., using any suitable interface(s) presented by the configurable components. For example, the tuning controller 110 may configure the service 161A with a particular value 162A for the configuration parameter 121A, a particular value 162B for the configuration parameter 121B, and a particular value 162N for the configuration parameter 121N. The value 162A may be included in the candidate values 122A, the value 162B may be included in the candidate values 122B, and the value 162N may be included in the candidate values 122N. In one embodiment, the tuning controller 110 may use the test run execution functionality 130 to configure the server 160A with the particular values 162A-162B. In various embodiments, the servers 160A-160N and/or services 161A-161N may be configured with the same values for the configuration parameters for a particular test run. In various embodiments, the servers 160A-160N and/or services 161A-161N may be configured with different values (at least in part) for the configuration parameters for a particular test run.

Figure 3:
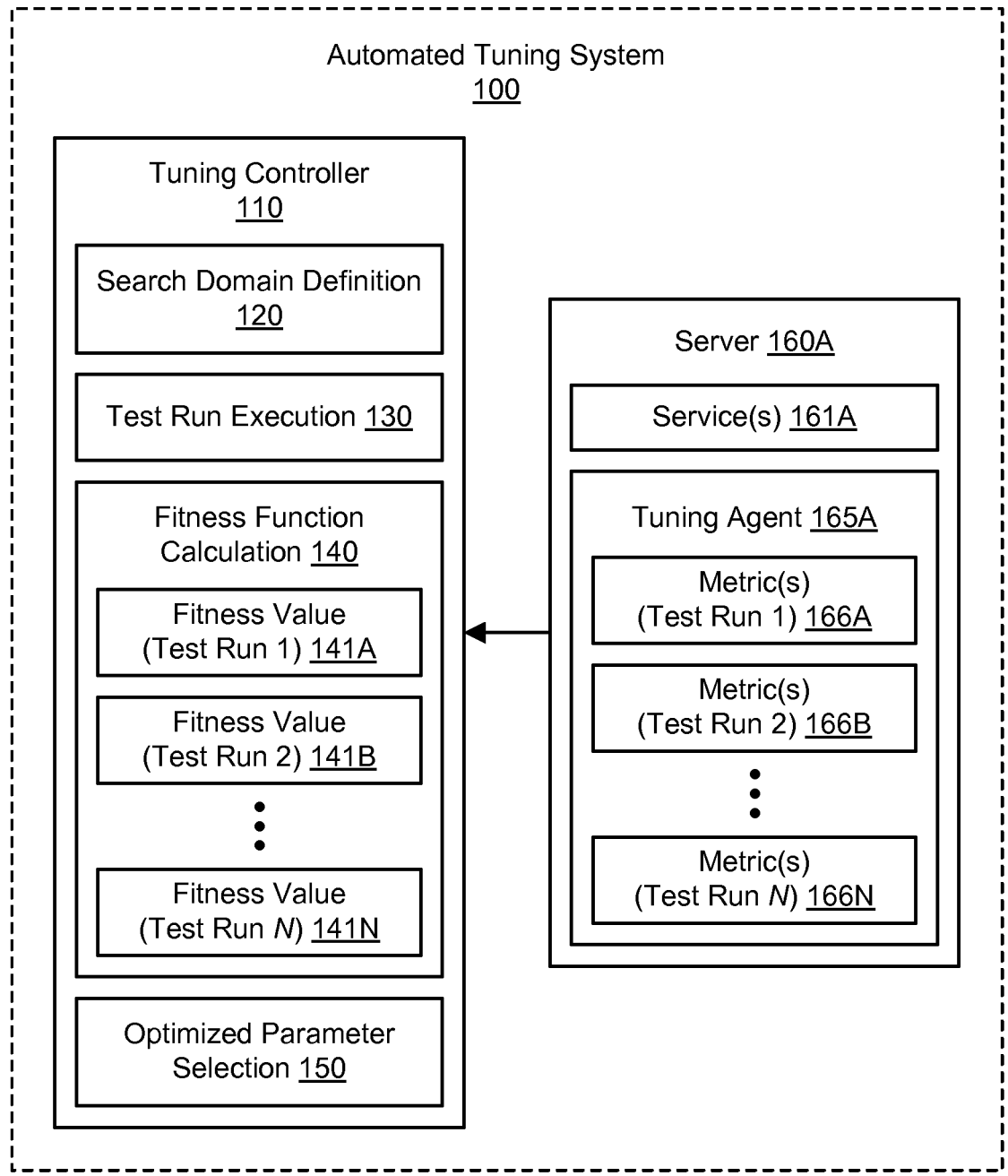
FIG. 3 illustrates an example system environment for automated service tuning including the calculation of fitness values according to a fitness function, according to one embodiment.

FIG. 3 illustrates an example system environment for automated service tuning including the calculation of fitness values according to a fitness function, according to one embodiment. As discussed above, the test run execution functionality 130 may implement one or more test runs using the servers 160A-160N. The tuning agent 165A and/or any other suitable component(s) may collect performance metrics during a test run to gauge the relative success or failure of the subset of candidate values used in the test run. For example, the performance metrics may include latency metrics, TPS (transactions per second) metrics, cost-related metrics, etc. The metrics may relate to the individual performance of the server 160A and/or service 161A and also to the interaction of the server 160A and/or service 161A with other components used in the test run. A different set of metrics may be collected for each test run. As shown in FIG. 3, for example, the tuning agent 165A may collect metrics 166A for a first test run, metrics 166B for a second test run, and metrics 166N for an Nth test run. Although three sets of metrics 166A, 166B, and 166N are illustrated for purposes of example, it is contemplated that any suitable number and configuration of metrics may be used with the automated tuning system 100.

The metrics for each test run may be provided to the automated tuning system 100, e.g., for use by the fitness function calculation functionality 140. The tuning controller 110 may calculate multiple fitness values, e.g., at least one fitness value per test run. As shown in FIG. 3, for example, the tuning controller 110 may calculate one fitness value 141A based on the metrics 166A for the first test run, another fitness value 141B based on the metrics 166B for the second test run, and yet another fitness value 141N based on the metrics 166N for the Nth test run. A fitness value may represent the fitness of a test run (and of the candidate values selected for a test run) relative to one or more performance goals and/or cost goals. In one embodiment, the fitness values 141A-141N may also be based on elements in addition to the metrics 166A-166N, such as metrics collected for other servers and/or services.

Figure 4:
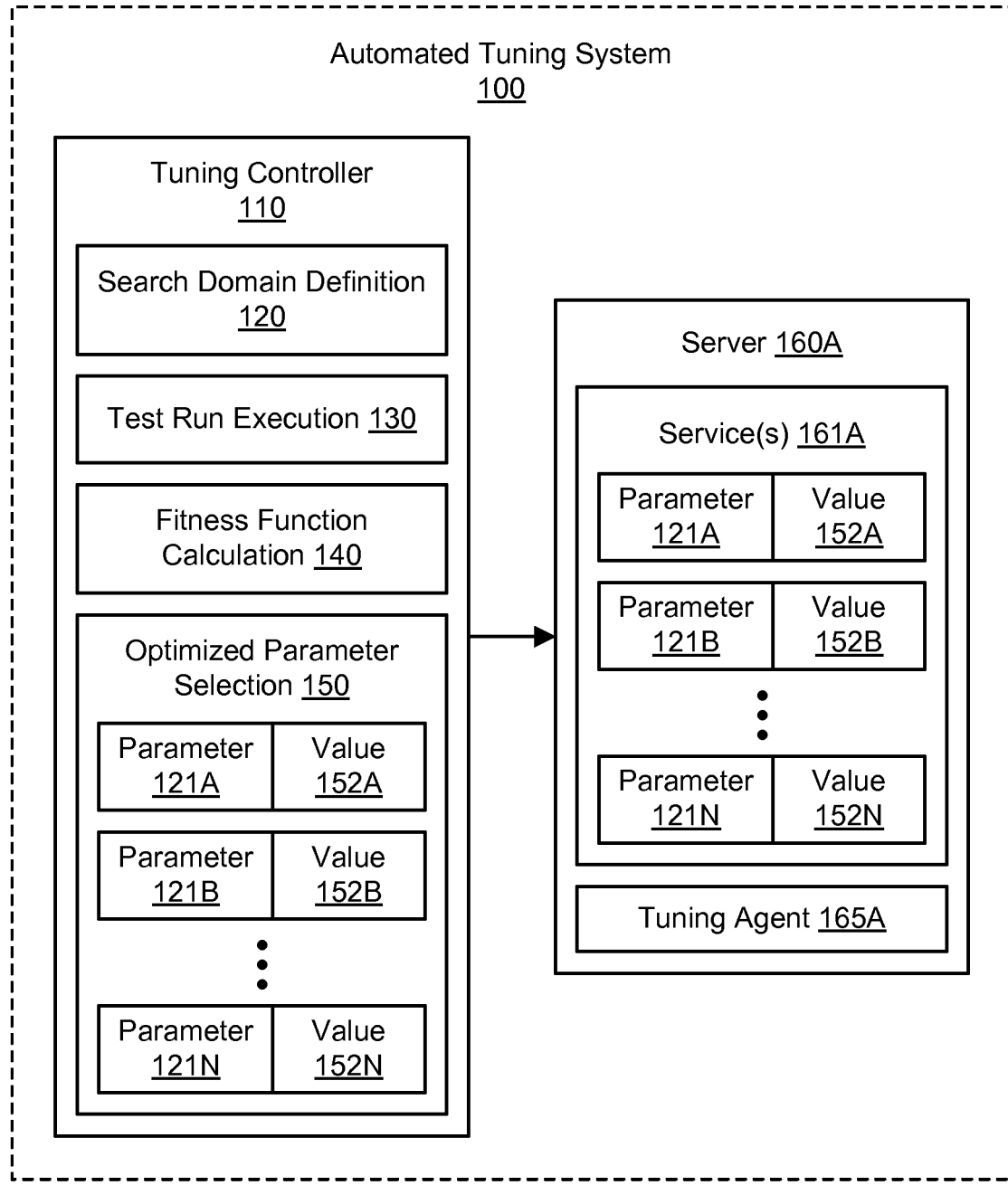
FIG. 4 illustrates an example system environment for automated service tuning including the selection of optimized parameters based on fitness values, according to one embodiment.

FIG. 4 illustrates an example system environment for automated service tuning including the selection of optimized parameters based on fitness values, according to one embodiment. As discussed above, the optimized parameter selection functionality 150 may select one or more of the candidate values for the configuration parameters based on the results of the test runs (e.g., the fitness values). The optimized parameter selection functionality 150 may include a solver (e.g., for a genetic algorithm) that attempts to find, among the candidate values for the configuration parameters, a solution yielding the best fitness value. The solver may also generate "genomes" for additional test runs based on the results of previous test runs. Accordingly, the newly selected parameters may be provided back to one or more services as part of a subsequent test run or as an optimized solution that completes the current optimization process. For example, the optimized parameter selection functionality 150 may select a particular value 152A for the configuration parameter 121A, a particular value 152B for the configuration parameter 121B, and a particular value 152N for the configuration parameter 121N. The tuning controller 110 may then configure the service 161A with the particular value 152A for the configuration parameter 121A, the particular value 152B for the configuration parameter 121B, and the particular value 152N for the configuration parameter 121N. In various embodiments, the optimization process may end or be suspended if the performance and/or cost of the servers and/or services with the optimized values satisfies a particular goal, if a window of time for performing the optimization has expired, and/or if a predetermined number of iterations or test runs have been completed.

Figure 5:
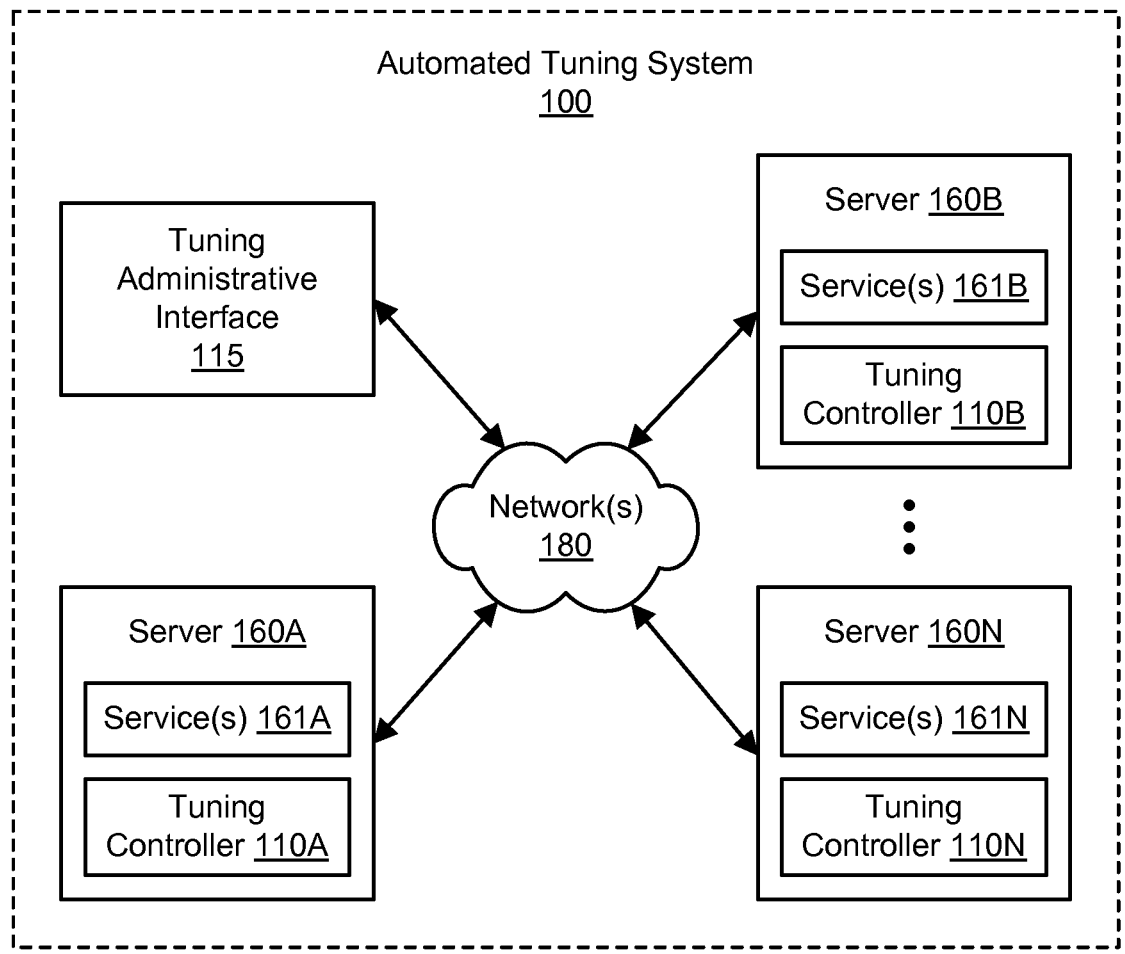
FIG. 5 illustrates an example system environment for automated service tuning including self-tuning services, according to one embodiment.

FIG. 5 illustrates an example system environment for automated service tuning including self-tuning services, according to one embodiment. In one embodiment, each server 160A-160N and/or service(s) 161A-161N may be "self-tuning" A distributed, automated tuning process for one or more servers and/or services may be controlled by a tuning administrative interface 115. Using the tuning administrative interface 115, an administrator of the automated tuning system 100 may supply input such as the configuration parameters and candidate values, etc. Each server may include its own tuning controller that implements similar functionalities (e.g., search domain definition functionality 120, test run execution functionality 130, fitness function calculation functionality 140, and optimized parameter selection functionality 150) as the tuning controller 110. For example, the server 160A may include a tuning controller 110A, the server 160B may include a tuning controller 110B, and the server 160N may include a tuning controller 110N. Using the local tuning controller, each server 160A-160N (and corresponding service(s) 161A-161N) may locally perform the automated tuning process discussed above with respect to FIGS. 1-4.

Using this self-tuning process, one or more services on a particular server may be taken offline, modified with different values for the configuration parameters, recompiled or rebuilt, and relaunched with the new configuration. In one embodiment, a service and/or server may be periodically tuned in this manner to find an optimized set of values for the configuration parameters. In one embodiment, all or part of the optimized set of values may be propagated to other services and/or servers over time.

Figure 6:
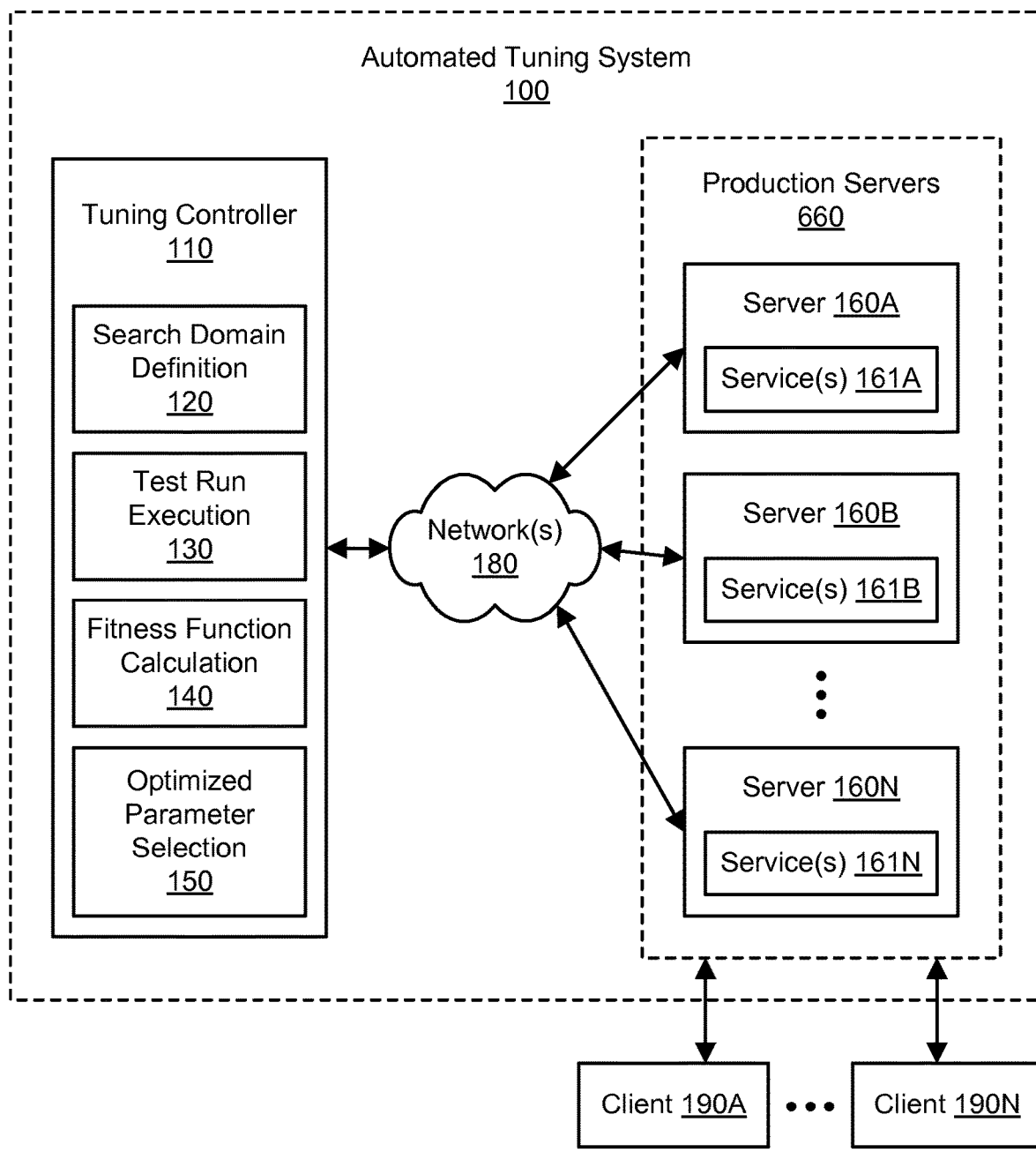
FIG. 6 illustrates an example system environment for automated service tuning of production servers, according to one embodiment.

FIG. 6 illustrates an example system environment for automated service tuning of production servers, according to one embodiment. In one embodiment, the servers 160A-160N used in one or more test runs may be part of a pool of production servers 660. During a test run, the production servers 660 may be deployed to interact with real-world clients, e.g., clients of the entity on whose behalf the services 161A-161N are run. The interactions between the production servers and the clients, such as clients 190A and 190N, may be referred to as production traffic. Although two clients 190A and 190N are illustrated for purposes of example, it is contemplated that any suitable number of clients may be used in conjunction with the automated tuning system 100. In one embodiment, any of the clients 190A-190N may be implemented by the example computing device 3000 illustrated in FIG. 10.

In one embodiment, individual ones of the production servers 660 may be selected and/or provisioned for use in a test run based on their hardware platform, operating system, installed services, and/or other suitable considerations. In one embodiment, one or more of the production servers 660 may be taken offline (e.g., isolated from production traffic) so that their local services can be modified with different values for the configuration parameters, recompiled or rebuilt, and relaunched with the new configuration. In one embodiment, a production server may be periodically tuned in this manner to find an optimized set of values for the configuration parameters. In one embodiment, all or part of the optimized set of values may be propagated to other production servers over time. In this manner, the production servers 660 may be continuously tuned in a manner that affects only a subset of the production servers 660 at any given time.

Figure 7:
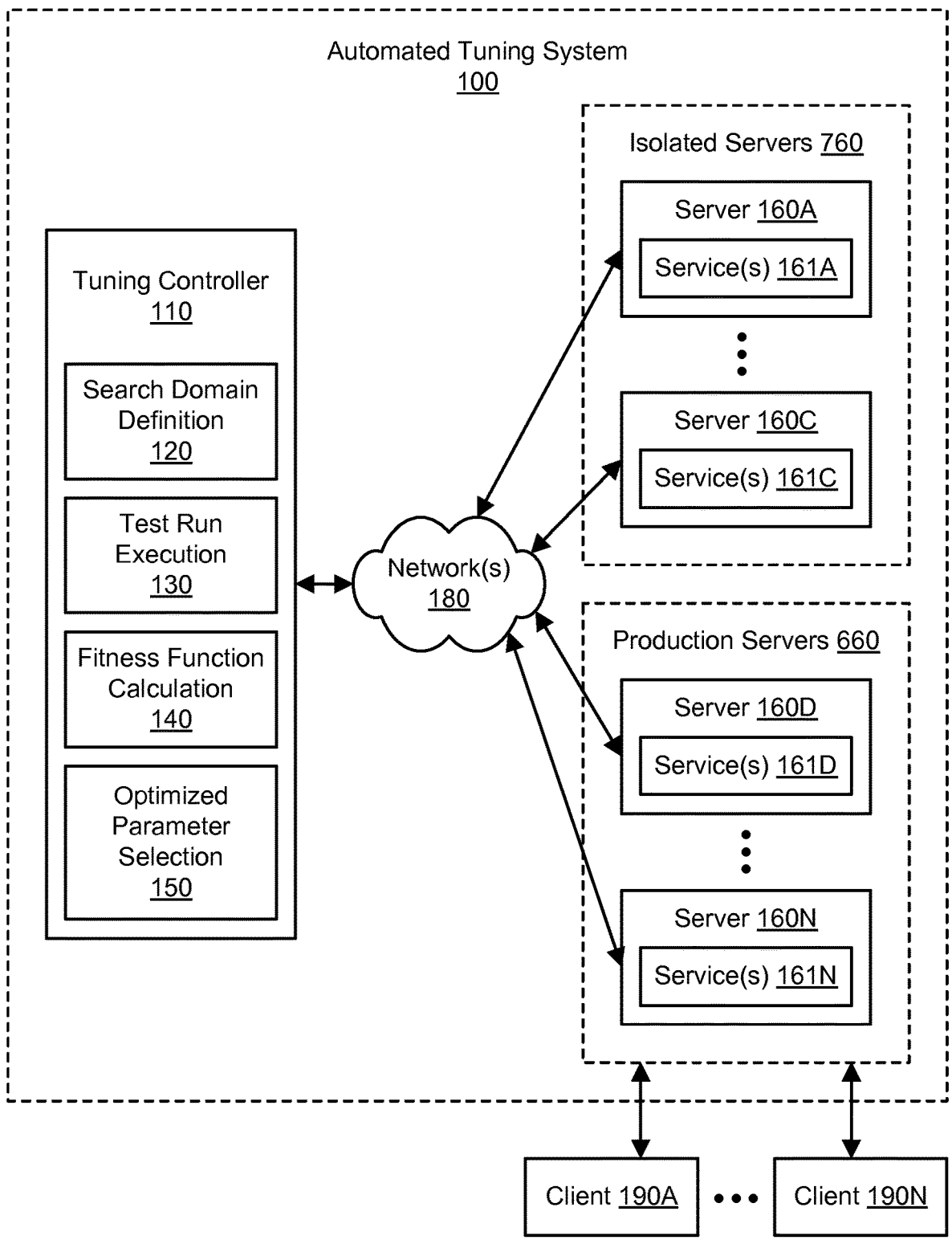
FIG. 7 illustrates an example system environment for automated service tuning of servers isolated from production traffic, according to one embodiment.

FIG. 7 illustrates an example system environment for automated service tuning of servers isolated from production traffic, according to one embodiment. In one embodiment, test runs may use one or more servers that are isolated from production traffic. For example, a set of isolated servers 760 may include servers 160A through 160C (respectively offering service(s) 161A through 161C). A set of production servers 660 may include servers 160D through 160N (respectively offering service(s) 161D through 161N). The isolated servers 760 may be used in one or more test runs while isolated from the real-world clients 190A-190N. Client traffic for the isolated servers 760 may be provided using any suitable technique(s), such as prerecorded or sampled production traffic, routing of "shadow" requests from production servers, synthetic client traffic, etc. On the other hand, the production servers 660 may be used in one or more test runs while allowed to interact with the real-world clients 190A-190N.

In one embodiment, the isolated servers 760 may represent servers that are temporarily taken out of a pool of production servers in order to participate in one or more test runs. The candidate values for configuration parameters may be broader in scope for the isolated servers 760 than for the production servers 660. In one embodiment, the isolated servers 760 may be used to find a restricted and relative safe range of candidate values, and the restricted range of candidate values may then be deployed to the production servers for one or more test runs. For the isolated servers 760, the configuration parameters may indicate the number and/or configuration of servers to be used for a test run. Similarly, for the production servers 660, the configuration parameters may indicate the number and/or configuration of servers to be used for a test run, such as a number or a percentage relative to a fleet of production servers.

Figure 8:
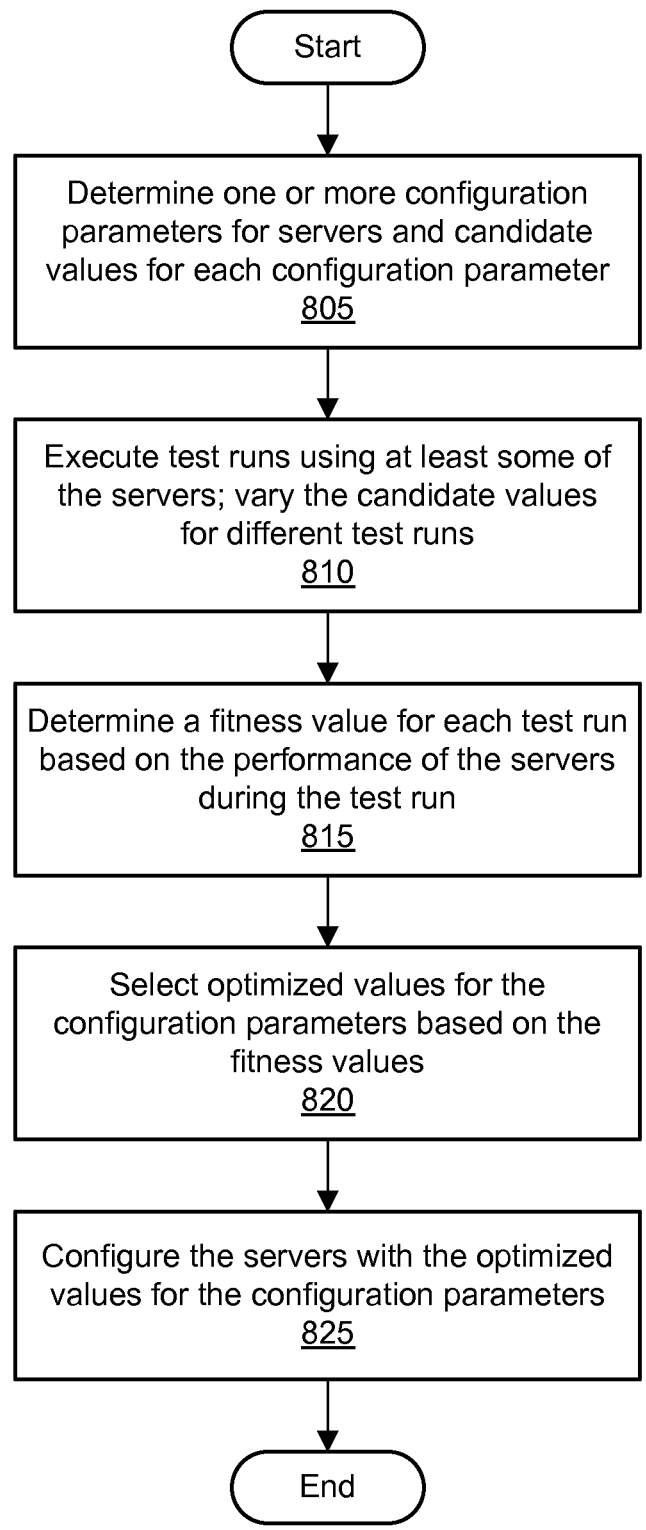
FIG. 8 is a flowchart illustrating a method for automated service tuning, according to one embodiment.

FIG. 8 is a flowchart illustrating a method for automated service tuning, according to one embodiment. As shown in 805, one or more configuration parameters may be determined for a plurality of servers (including services run by the servers). The configuration parameters may affect the performance characteristics and/or cost characteristics of the servers and their services. Candidate values may also be determined for each configuration parameter. Value boundaries and/or seed values may also be determined for particular configuration parameters.

As shown in 810, test runs may be executed using at least some of the servers. The candidate values for the configuration parameters may vary from test run to test run. In one embodiment, the test runs may use multiple servers operating in parallel. In one embodiment, the candidate values may vary for the servers operating in parallel.

As shown in 815, a fitness value may be determined for each test run. The fitness value may be determined based on a fitness function, and the fitness function may include terms representing performance metrics (including cost metrics) for the servers and/or services. Accordingly, each fitness value may indicate the fitness of the candidate values in a particular test run, relative to one or more performance goals and/or cost goals.

As shown in 820, optimized values may be selected for the configuration parameters. A solver may use a non-linear optimization technique such as a genetic algorithm to find the optimized values. In one embodiment, the optimized values may correspond to the candidate values for one or more test runs having the best fitness values. As shown in 825, the entire set of servers may be configured with the optimized values for the configuration parameters.

Figure 9:
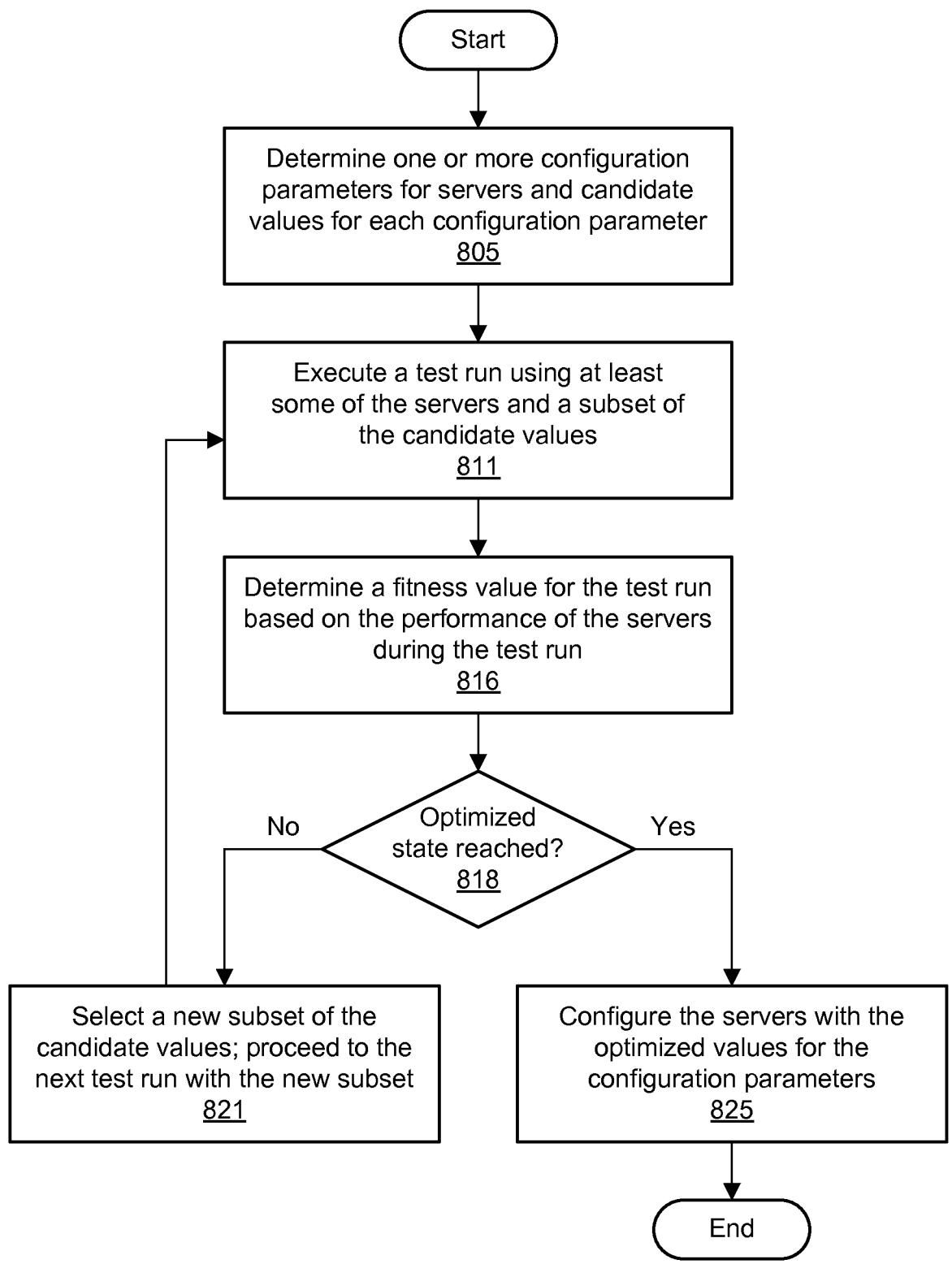
FIG. 9 is a flowchart illustrating a method for automated service tuning, according to one embodiment.

FIG. 9 is a flowchart illustrating a method for automated service tuning, according to one embodiment. As shown in 805, one or more configuration parameters may be determined for a plurality of servers (including services run by the servers). The configuration parameters may affect the performance characteristics and/or cost characteristics of the servers and their services. Candidate values may also be determined for each configuration parameter. Value boundaries and/or seed values may also be determined for particular configuration parameters.

As shown in 811, a test run may be executed using at least some of the servers. A subset of the candidate values for the configuration parameters may be assigned to the servers (and their services) for the current test run. In one embodiment, the test run may use multiple servers operating in parallel. In one embodiment, the candidate values may vary for the servers operating in parallel.

As shown in 816, a fitness value may be determined for the current test run after the test run has terminated. The fitness value may be determined based on a fitness function, and the fitness function may include terms representing performance metrics (including cost metrics) for the servers and/or services. Accordingly, the fitness value may indicate the fitness of the candidate values in a particular test run, relative to one or more performance goals and/or cost goals.

As shown in 818, it may be determined whether an optimized state has been reached. In one embodiment, an optimized state may be determined to have been reached if a maximum number of test runs or generations of test runs have been completed. In one embodiment, an optimized state may be determined to have been reached if the fitness value indicates that a sufficient level of fitness has been achieved. If the optimized state has not been reached, then as shown in 821, a new subset of the candidate values may be selected (e.g., using a genetic algorithm to generate one or more new genomes based on one or more previous genomes); the method may proceed to the next test run with the new subset of candidate values.

If the optimized state has been reached, then as shown in 825, the entire set of servers (and their services) may be configured with the optimized values for the configuration parameters. A solver may use a non-linear optimization technique such as a genetic algorithm to find the optimized values. In one embodiment, the optimized values may correspond to the candidate values for one or more test runs having the best fitness values.

Illustrative Computer System

In at least some embodiments, a computer system that implements a portion or all of one or more of the technologies described herein may include a general-purpose computer system that includes or is configured to access one or more computer-readable media. FIG. 10 illustrates such a general-purpose computing device 3000. In the illustrated embodiment, computing device 3000 includes one or more processors 3010a-3010n coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010a and 3010b through 3010n (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices configured to implement an automated tuning system comprising a tuning controller and a plurality of servers, wherein the tuning controller is configured to:
determine one or more configuration parameters for respective servers of the plurality of servers and a plurality of candidate values for the one or more configuration parameters;
subsequent to the determination of the one or more configuration parameters for the respective servers and the candidate values for the one or more configuration parameters, cause execution of a test batch comprising a predetermined number of tests that use the plurality of candidate values, wherein the predetermined number of tests comprise a plurality of tests executed on at least two of the plurality of servers, wherein different tests of the predetermined number of tests use different ones of the candidate values for the one or more configuration parameters;
determine a different respective fitness value for individual ones of the predetermined number of tests executed on the at least two servers, wherein a given fitness value for a given test is determined based on a performance of the at least two servers during the given test;
subsequent to execution of the predetermined number of tests of the test batch that use the plurality of candidate values on the at least two servers, determine, based on the different respective fitness values for the predetermined number of tests of the test batch, one or more candidate values that were used for each of the at least two servers during a particular one of the predetermined number of tests as one or more optimized values for the one or more configuration parameters, wherein the one or more optimized values improve a collective performance of the at least two servers more than other ones of the one or more candidate values that were used for each of the at least two servers during remaining tests of the predetermined number of tests; and
configure the at least two servers with the one or more optimized values for the one or more configuration parameters.

2. The system as recited in claim 1, wherein the one or more configuration parameters comprise a host type, wherein the host type indicates a hardware platform for a host, and wherein at least a portion of the plurality of tests vary the host type for at least a portion of the plurality of servers.

3. The system as recited in claim 1, wherein individual ones of the plurality of servers implement a plurality of services, wherein execution of the plurality of tests comprises collective execution of the individual ones of the plurality of services using the individual ones of the plurality of servers, and wherein the fitness values are determined based on a collective performance of the individual ones of the plurality of services during the plurality of tests.

4. A computer-implemented method, comprising:
determining one or more configuration parameters for respective servers of a plurality of servers and a plurality of candidate values for the one or more configuration parameters;
subsequent to determining the one or more configuration parameters for the respective servers and the candidate values for the one or more configuration parameters, performing a test batch comprising a predetermined number of tests that use the plurality of candidate values, wherein the predetermined number of tests comprise a plurality of tests executed on at least two of a plurality of servers, wherein different tests of the predetermined number of tests use different ones of the candidate values for the one or more configuration parameters;
determining a different respective fitness value for individual ones of the predetermined number of tests executed on the at least two servers, wherein a given fitness value for a given test is determined based on a performance of the at least two servers during the given test;
subsequent to performing the predetermined number of tests of the test batch that use the plurality of candidate values on the at least two servers, determining, based on the different respective fitness values for the predetermined number of tests of the test batch, one or more candidate values that were used for each of the at least two servers during a particular one of the predetermined number of tests as one or more optimized values for the one or more configuration parameters, wherein the one or more optimized values are selected to improve a collective execution of the at least two servers more than other ones of the one or more candidate values that were used for each of the at least two servers during remaining tests of the predetermined number of tests.

5. The method as recited in claim 4, wherein the one or more configuration parameters comprise a host type, wherein the host type indicates a hardware platform for a host, and wherein at least a portion of the plurality of tests vary the host type for at least a portion of the plurality of servers.

6. The method as recited in claim 4, wherein individual ones of the plurality of servers implement a plurality of services, wherein execution of the plurality of tests comprises collective execution of the individual ones of the plurality of services using the individual ones of the plurality of servers, and wherein the fitness values are determined based on a collective performance of the individual ones of the plurality of services during the plurality of tests.

7. The method as recited in claim 4, wherein the one or more optimized values optimize a latency metric, a throughput metric, a cost metric, or a combination thereof for the plurality of servers.

8. The method as recited in claim 4, further comprising:
selecting the plurality of servers from a pool of production servers;
tuning the selected plurality of servers using the one or more optimized values; and
returning the tuned plurality of servers to the pool of production servers.

9. The method as recited in claim 4, wherein the one or more configuration parameters indicate a quantity of servers in a pool of production servers to be used in performing the plurality of tests.

10. The method as recited in claim 4, further comprising:
performing an additional plurality of tests using the plurality of servers at a plurality of points in time; and
tuning the plurality of servers an additional number of times based on the additional plurality of tests.

11. The method as recited in claim 4, wherein, in performing a first portion of the plurality of tests, the plurality of servers are isolated from production traffic.

12. The method as recited in claim 11, wherein, in performing a second portion of the plurality of tests, the candidate values are restricted based on the first portion of the plurality of tests, and the plurality of servers are configured to interact with production traffic.

13. A non-transitory computer-readable storage medium storing program instructions computer-executable to perform:
   determining one or more configuration parameters for respective servers of a plurality of servers and a plurality of candidate values for the one or more configuration parameters;
   subsequent to determining the one or more configuration parameters for the respective servers and the candidate values for the one or more configuration parameters, performing a test batch comprising a predetermined number of tests that use the plurality of candidate values, wherein the predetermined number of tests comprise a plurality of tests using a plurality of services, wherein individual ones of the plurality of tests comprise executing at least a portion of the plurality of services on at least two of the respective servers in parallel and collecting performance metrics for the plurality of services, and wherein different tests of the predetermined number of tests use different ones of the candidate values for the one or more configuration parameters;
   determining a different respective fitness value for individual ones of the predetermined number of tests executed on the at least two servers, wherein a given fitness value for a given test is determined based on a performance of the plurality of services during the given test;
   subsequent to performing the predetermined number of tests of the test batch that use the plurality of candidate values on the at least two servers, determining, based on the different respective fitness values for the predetermined number of tests of the test batch, one or more candidate values that were used for each of the at least two servers during a particular one of the predetermined number of tests as one or more optimized values for the one or more configuration parameters, wherein the one or more optimized values improve an interaction among the plurality of services more than other ones of the one or more candidate values that were used for each of the at least two servers during remaining tests of the predetermined number of tests.

14. The non-transitory computer-readable storage medium as recited in claim 13, wherein the one or more configuration parameters comprise a host type, wherein the host type indicates a hardware platform for a host, and wherein at least a portion of the plurality of tests vary the host type for at least a portion of the plurality of services.

15. The non-transitory computer-readable storage medium as recited in claim 13, wherein the one or more optimized values optimize a latency metric, a throughput metric, a cost metric, or a combination thereof for the plurality of services.

16. The non-transitory computer-readable storage medium as recited in claim 13, wherein the one or more configuration parameters indicate a quantity of servers to be used in performing the plurality of tests.

17. The non-transitory computer-readable storage medium as recited in claim 13, wherein the one or more configuration parameters indicate a quantity of instances of one of the plurality of services to be used in performing the plurality of tests.

18. The non-transitory computer-readable storage medium as recited in claim 13, wherein individual ones of the plurality of services are implemented in respective service tiers, wherein individual ones of the plurality of tests comprise executing at least a portion of the plurality of services in individual ones of the service tiers and collecting performance metrics for the plurality of services in the individual ones of the service tiers, and wherein the one or more optimized values optimize at least one interaction between the individual ones of the service tiers.

19. The non-transitory computer-readable storage medium as recited in claim 13, wherein, in performing a first portion of the plurality of tests, the plurality of services are isolated from production traffic.

20. The non-transitory computer-readable storage medium as recited in claim 19, wherein, in performing a second portion of the plurality of tests, the candidate values are restricted based on the first portion of the plurality of tests, and the plurality of services are configured to interact with production traffic.

* * * * *